United States Patent
Westin et al.

(10) Patent No.: US 9,160,663 B2
(45) Date of Patent: Oct. 13, 2015

(54) DYNAMIC CONGESTION CONTROL

(71) Applicants: Patrik Göran Westin, Palo Alto, CA (US); James Anthony Roskind, Redwood City, CA (US)

(72) Inventors: Patrik Göran Westin, Palo Alto, CA (US); James Anthony Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/843,370

(22) Filed: Mar. 15, 2013

(65) Prior Publication Data
US 2014/0269326 A1    Sep. 18, 2014

(51) Int. Cl.
*H04L 12/801* (2013.01)
*H04L 12/851* (2013.01)
*H04L 12/811* (2013.01)

(52) U.S. Cl.
CPC .......... *H04L 47/10* (2013.01); *H04L 47/24* (2013.01)

(58) Field of Classification Search
None
See application file for complete search history.

(56) References Cited

U.S. PATENT DOCUMENTS

| | | | |
|---|---|---|---|
| 5,936,940 A * | 8/1999 | Marin et al. | 370/232 |
| 6,820,128 B1 | 11/2004 | Firoiu | |
| 2009/0316581 A1 | 12/2009 | Kashyap et al. | |
| 2010/0165878 A1 * | 7/2010 | Soni | 370/254 |
| 2013/0114421 A1 * | 5/2013 | Qian et al. | 370/252 |

FOREIGN PATENT DOCUMENTS

WO    WO 2011/109568    9/2011

OTHER PUBLICATIONS

Striegel, et al., "Packet scheduling with delay and loss differentiation," Computer Communications, Jan. 2002, vol. 25, No. 1, pp. 21-31.

* cited by examiner

*Primary Examiner* — Alex Skripnikov
*Assistant Examiner* — Calvin Hsieh
(74) *Attorney, Agent, or Firm* — McDermott Will & Emery LLP

(57) ABSTRACT

A system and method is disclosed for moving between delay sensing and packet loss based congestion control states. In connection with communicating over a network by sending and receiving data, one or more network devices automatically selects between a first and a second congestion control state for the sending and receiving of the data based a predetermined algorithm. The devices move between the first and the second congestion control states to maintain a bit rate associated with the sending and receiving at a predetermined threshold according to the predetermined algorithm.

17 Claims, 4 Drawing Sheets

DYNAMIC CONGESTION CONTROL

BACKGROUND

Today's internet equipment (modems, routers, firewalls etc) have some amount of buffers, the amount of memory has increased much faster than the bandwidth they serve, this might introduce significant network delay, and thus a bad user experience especially for real-time application such as video conferencing. Many of these real-time application have built various different delay sensing methods, but the issue is that when they compete with a protocol that only reacts to packet loss, they are loosing out and end up using less than their fair share of the network resources.

SUMMARY

The subject technology provides a system and method for dynamically changing between congestion control states. According to one aspect, a computer-implemented method may comprise determining a packet latency and a packet loss rate for a data stream, and selecting, in response to the determining, a congestion control state for the data stream based on the packet latency and the packet loss rate and a predetermined algorithm, wherein a first state of the congestion control state adjusts a bit rate associated with the data stream based on the packet latency, and the second state of the congestion control state adjusts the bit rate based on the packet loss rate, wherein the congestion control state is switched from the first state to the second state if the packet latency satisfies a delay threshold after a predetermined period of time in the first state. Other aspects include corresponding systems, apparatus, and computer program products.

In another aspect, a machine-readable medium may have instructions stored thereon that, when executed, cause a machine to perform a method for dynamically changing between congestion control algorithms. In this regard, the method may comprise communicating with a network device by sending and receiving data, selecting between a first and a second congestion control state for the sending and receiving of the data based a predetermined algorithm, and moving between the first and the second congestion control states to maintain a bit rate associated with the sending and receiving at a predetermined threshold, wherein the first state adjusts a bit rate associated with the sending and receiving based on a packet latency associated with the sending and receiving, and the second state adjusts the bit rate based on a packet loss rate associated with the sending and receiving.

In a further aspect, a system may include one or more network devices, and a memory. The memory may include instructions thereon that, when executed, cause the one or more processors to communicate over a network by sending and receiving data, select between a first and a second congestion control state for the sending and receiving of the data based a predetermined algorithm, and move between the first and the second congestion control states to maintain a bit rate associated with the sending and receiving at a predetermined threshold according to the predetermined algorithm, wherein the first state adjusts a bit rate associated with the sending and receiving based on a packet latency associated with the sending and receiving to maintain the packet latency below a first threshold, and the second state adjusts the bit rate based on a packet loss rate associated with the sending and receiving to maintain the packet loss rate below a second threshold.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
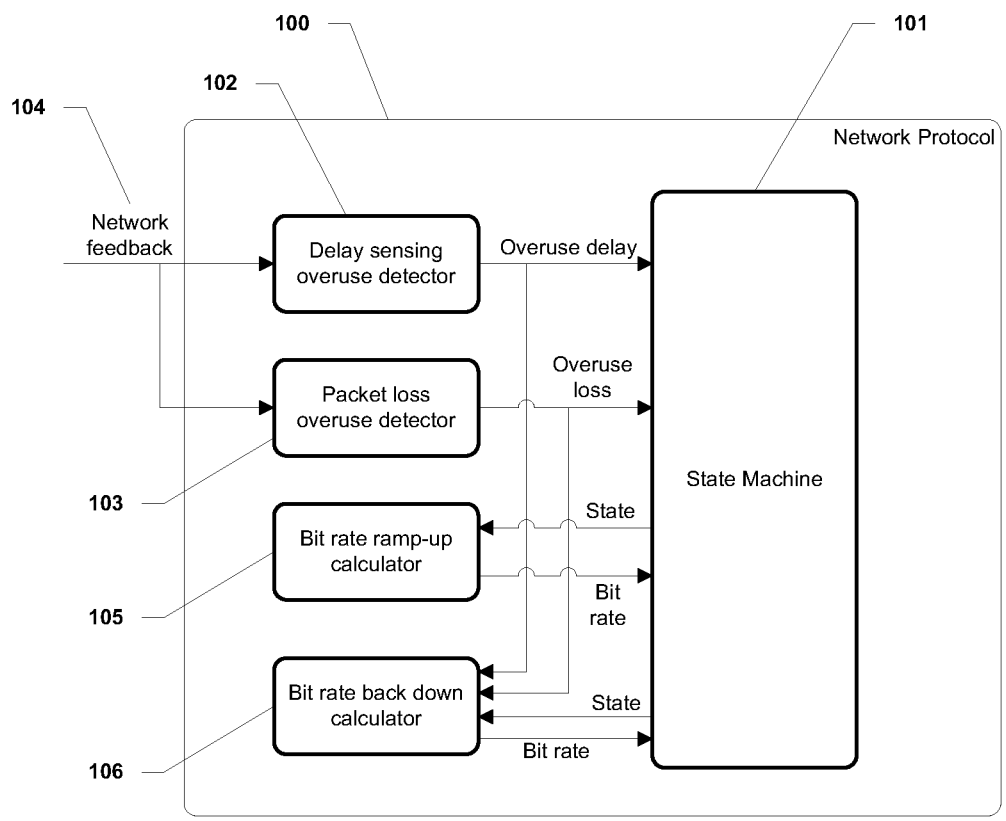
FIG. 1 is a data flow diagram for an example congestion control components of a network protocol.

TCP congestion control is loss-based, in that it relies on packet loss in determining whether to effectively reduce bit rate. On the other hand, delay based congestion control reduces bit rate when a packet time metric increases beyond a predetermined threshold. Increases in packet transit times may also provide an indication that the size of the data buffers along the network path are growing.

TCP (and like protocols) may increase transmission rates until buffers are bloated and packet loss results. A delay sensing protocol may operate at a certain transmission rate while it does not compete with TCP (and like protocols) in a bottleneck, but may back down to leave more room for TCP (and like protocols), resulting in an unnecessarily low share of network bandwidth for the delay sensing protocol. The subject technology provides a network protocol that may forfeit the goal of a delay sensing protocol to operate without bufferbloat in order to regain a reasonable share of network bandwidth. The network protocol operates to transition between delay based and loss based congestion control states.

According to the subject technology, a congestion control algorithm (e.g., implemented as a state machine) is configured to switch between multiple congestion control states based on bandwidth overuse. Bandwidth overuse may be detected based on measuring packet time metrics. A packet time metric may include, for example, an "inter-arrival time"—i.e., the delta of time between the arrival of one packet and the arrival of a second packet, "inter-departure time"—i.e., the delta of time between the departure of one packet and the departure of a second packet, "single direction transit time"—i.e., the time between the departure and arrival of a packet in one direction, or a "round trip time" (RTT).

In some implementations, a first control state manages congestion based on a change in single direction (e.g., one way) transit time. The single direction transit time may be determined (e.g., calculated or measured) by software or hardware located at the receiving or transmitting end. For example, the first control state may be entered when the current single direction transit time increases to a level that satisfies a predetermined delay threshold (also indicating that the cumulative network buffer delay has likely expanded beyond a predetermined buffer threshold). The predetermined delay threshold may be an absolute or relative threshold with respect to some observed time metric, such as above a multiple of some observed time (e.g., 1.1 times the minimum observed time metric), or some time increment above an observed time metric (e.g., 50 ms greater than the minimum observed packet time metric).

A second control state manages congestion based on packet loss. The amount of packet loss may be determined by software or hardware located at the receiving or transmitting end. In one example, the second control state is entered when the current packet loss rate is greater than a packet loss threshold.

During data streaming operations, the current packet time metric and current packet loss rate are periodically determined. When the current packet time metric satisfies the delay threshold (the first state) the congestion control algorithm reduces a bit rate associated with the data stream. The congestion control algorithm then determines whether congestion has been alleviated by determining whether the time metric decreases. If the time metric does not decrease then a competing protocol may be implicated as competing for bandwidth. In this case, the congestion control algorithm increases the bit rate to equalize the competition, reduces sensitivity to delay, and increases sensitivity to packet loss. In some aspects, sensitivity to delay may be reduced by increasing the delay threshold, and sensitivity to packet loss may be increased by reducing the packet loss threshold.

When the current packet loss rate is greater than a packet loss threshold (the second state), the congestion control algorithm may reduce a bit rate associated with the data stream. The congestion control algorithm then determines the packet loss rate decreases. If the current packet loss rate does not decrease then the bit rate may be increased (e.g., to previous levels). The congestion control algorithm then increases sensitivity to delay and reduces sensitivity to packet loss. For example, the delay threshold may be reduced and the packet loss threshold may be increased.

In some aspects, the congestion control algorithm may determine a confidence value for each correction based on a number of prior similar corrections. The confidence value may grow each time the same determination is made for a predetermined period of time, or over successive intervals. Accordingly, the congestion control algorithm may not adjust bit rate until the confidence value for the current adjustment is above a predetermined threshold, thereby eliminating short-term congestion problems. In some aspects, the congestion control algorithm may turn off delay sensing completely (e.g., removing the first state) if after a predetermined number of corrections (e.g., in the first state) the current time metric is not reduced.

FIG. 1 is a data flow diagram for an example congestion control components of a network protocol 100 according to some aspects of the subject technology. The congestion control components of network protocol 100 may be implemented by one or more network devices (including, e.g., a router, desktop or server computer, tablet or notebook computer, personal data assistant, smart phone, augmented-reality glasses, a television or other display device with one or more computing devices embedded therein or attached thereto, or the like).

The congestion control components of network protocol 100 include a state machine 101 for monitoring bandwidth of a network, and for adjusting a bit rate of one or more data streams over the network. In this regard, network protocol 100 includes a delay sensing overuse detector 102 and a packet loss overuse detector 103. Detectors 102 and 103 consume network feedback 104 and pass it on to state machine 101 by observing and analyzing packets transmitted over the network and providing overuse status to state machine 101. Delay sensing overuse detector 102 detects bandwidth overuse by analyzing packet time metrics in the previously described manner. Packet loss overuse detector 103 detects bandwidth overuse by analyzing packet loss rates in the previously described manner.

On detecting bandwidth overuse from one or both of delay sensing overuse detector 102 and packet loss overuse detector 103, state machine 101 determines and selects a congestion control state for the network protocol. In this regard, state machine 101 may determine between a delay based state and a loss based state according to a predetermined priority, or, as will be described in further detail with regard to FIGS. 2 and 3, by prioritizing the states based on their current threshold values.

State machine 101 may determine whether a current increase (or decrease) in latency, or current increase (or decrease) in packet loss is a bona fide representation of bandwidth overuse. An overuse event may include a signal from delay sensing overuse detector 102 or packet loss overuse detector 103 that latency or packet loss is increasing or has increased beyond a predetermined threshold for a window of time. State machine 101 keeps track (e.g., a count) of how many overuse events have taken place within the window of time. In one example, an overuse event that is detected before a predetermined period of time after a previous event has elapsed may be ignored, while an event detected after the predetermined period of time may be counted.

By counting the number of overuse events from delay sensing overuse detector 102 (e.g., due to delay), state machine 101 is able to determine that a packet time metric is increasing (e.g., over a threshold, a previous time metric, or the like). Likewise, by counting the number of overuse events from packet loss overuse detector 103 (e.g., due to packet loss), state machine 101 is able to determine that a packet loss rate is increasing (e.g., over a threshold, over a previous packet loss rate, or the like).

While the number of events do not satisfy a predetermined event threshold (e.g., lower than the threshold) the state machine 101 determines that the event should not be acted upon and ignores the event. In this case, state machine 101 may indicate that the network is in a "stable state" to other components. If the number of events satisfies the predetermined event threshold (e.g., greater than the threshold) then state machine 101 determines that the event should be acted upon.

The congestion control components of network protocol 100 further include a bit rate ramp up calculator 105 and a bit rate back-down calculator 106 that work with state machine 101 and the network protocol to increase or decrease a bit rate for a current data stream managed by the network protocol. Calculators 105 and 106 may, for example, be responsible for adjusting the bit rate, or may provide the bit rate to state machine 101 for adjustment by state machine 101. Bit rate ramp up calculator 105 determines (e.g., calculates) a new bit rate for the current data stream or an increase in a current bit rate based on the current bit rate and a signal from state machine 101 instructing calculator 105 to increase bit rate. In some aspects, bit rate ramp up calculator 105 may determine an increase in bit rate, even though state machine 101 is in a stable state, based on an indication that the network protocol is operating on an underutilized network with low latency and low packet loss (e.g., below a predetermined threshold).

If a higher amount of latency is detected (e.g., beyond a threshold) and low or no loss is detected then state machine

101 may determine that the current data stream managed by the network protocol is not competing with another stream for bandwidth. In this case, state machine 101 may signal bit rate back-down calculator 106 to adjust the bit rate downward just enough to bring latency within acceptable boundaries (e.g., based on predetermined values). State machine 101 may detect a competing flow by a determination that bandwidth overuse is persisting even after the current bit rate has been reduced in the previously described manner. In this case, so long as latency is within the acceptable boundaries, state machine 101 may instruct bit rate ramp up calculator 105 to increase bit rate. Accordingly, the bit rate may be incrementally increased until limited by network bandwidth.

Figure 2:
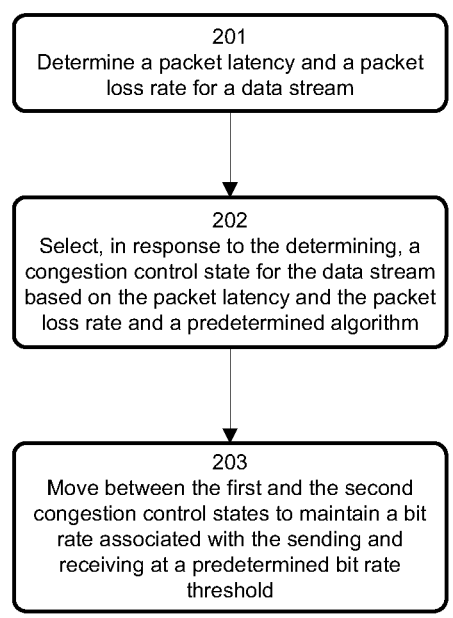
FIG. 2 is a flowchart illustrating a first example process for moving between delay sensing and packet loss based congestion control states.

FIG. 2 is a flowchart illustrating a first example process for moving between delay sensing and packet loss based congestion control states. According to some aspects, the blocks of FIG. 2 may be executed by network protocol 100 of FIG. 1, on one or more networked computing devices (e.g., a router, desktop or server computer, tablet or notebook computer, personal data assistant, smart phone, augmented-reality glasses, a television or other display device with one or more computing devices embedded therein or attached thereto, or the like). In this regard, the blocks of FIG. 2 may be performed within the context of sending and receiving data between two or more devices using a custom network protocol.

In block 201, communication is initiated with a network device by sending and receiving data. In various aspects, the data is sent and received using the network protocol of the subject technology. As described previously, the network protocol has the ability to move between delay sensing and packet loss based congestion control states. In block 202, the network protocol selects between a first and a second congestion control state for the sending and receiving of the data based a predetermined algorithm.

The predetermined algorithm may compare current latency times and/or packet loss rates for the data stream against respective thresholds to determine which congestion control state should be used. In one example, the network protocol responds to the threshold that is exceeded the most, and ignores the other. The comparison (e.g., latency above a threshold vs. lost packets above a threshold) may be done by using a scaling factor, and the metric that most exceeds its threshold is given priority, and a second smaller threshold excess may be ignored.

In another example, priority is always given to one threshold—if a first threshold is exceeded (e.g., due to excessive packet loss), then a second threshold is not considered (e.g., an excessive time metric). Another example, may vary a preferred threshold over time. If the preferred (e.g., currently prioritized) threshold is exceeded, then a second (e.g., deprioritized) threshold is not considered. Selection of the prioritization of a threshold may vary over time, such as changing after a predetermined, fixed periodic time interval, or changing at periodic time intervals associated with a status of the channel, such as a multiple of RTT durations.

In block 203, as further communications occur, the network protocol, moves between the first and the second congestion control states to maintain a bit rate associated with the sending and receiving at a predetermined bit rate threshold. In this regard, the first state adjusts a bit rate associated with the sending and receiving based on a packet latency associated with the sending and receiving, and the second state adjusts the bit rate based on a packet loss rate associated with the sending and receiving.

In various aspects, the predetermined bit rate threshold of block 203 may be determined based on a bit rate observed over a window of time. For example, before the first or second state is selected, the network protocol may monitor the bit rate, and calculate the predetermined bit rate threshold based on a highest rate observed, lowest rate observed, or average rate observed for the window of time.

While in the first state, the bit rate is reduced if the packet latency satisfies a delay threshold. The delay threshold may be established by first determining a base latency based on a plurality of packet latencies determined over a window of time, and then applying a scaling factor, or adding a predetermined time value, to the base latency to calculate an amount greater than the base latency. The network protocol then determines, for a period of time, whether the packet latency is reduced by a predetermined amount. The period of time may include a number of reductions in the packet latency or a number of RTT durations, or the like. The predetermined amount may be, for example, a time interval (e.g., 1 ms) or a percentage or other portion of the current latency determined by the application of a scaling factor to the current latency. In some implementations, the predetermined amount may be the delay threshold or other threshold value.

If the packet latency is reduced then the network protocol may continue to send and receive data at the current bit rate, or may continue to reduce the bit rate until a predetermined packet latency is reached. If, on the other hand, the packet latency is not reduced by the predetermined amount for the period of time then the network protocol increases the bit rate, and increases the delay threshold to make the first state less sensitive to network latency (e.g., preventing further attempts to decrease the bit rate at the current delay threshold). After sufficient time has elapsed with no significant reduction in latency, the network protocol may switch from the first state to the second state. However, in some implementations, the first state may be switched to the second state only if the packet loss rate satisfies the reduced packet loss threshold.

Figure 3:
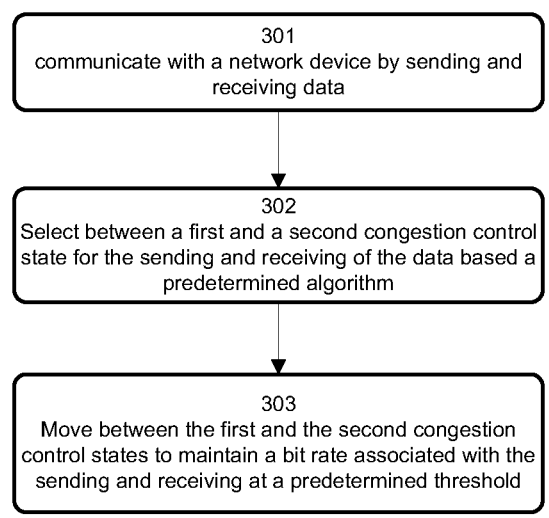
FIG. 3 is a flowchart illustrating a second example process for moving between delay sensing and packet loss based congestion control states.

FIG. 3 is a flowchart illustrating a second example process for moving between delay sensing and packet loss based congestion control states. Similar to the blocks of FIG. 2, the blocks of FIG. 3 may be executed by network protocol 100 of FIG. 1, on one or more networked computing devices. In this regard, the blocks of FIG. 3 may be performed within the context of sending and receiving data between two or more devices using a custom network protocol.

In block 301, a packet latency and a packet loss rate is determined for a data stream. Packet loss rate may be based on a current loss rate, or a highest or lowest or average loss rate observed for the window of time. In one example, the packet latency is calculated based on a delta of time between an arrival of one or more first packets and an arrival of one or more subsequent packets at a network device. In another example, the packet latency is calculated based (at least in part) on a delta of time between a departure of one or more first packets and a departure of one or more subsequent packets from a network device. In yet another example, the packet latency is calculated based on a time lapse between a departure of one or more packets from one or more first terminal devices and an arrival of the one or more packets at one or more second terminal devices.

In block 302, in response to the determining, a congestion control state for the data stream is selected based on the packet latency and the packet loss rate and a predetermined algorithm. According to block 302, a first state of the congestion control state adjusts a bit rate associated with the data stream based on the packet latency, and the second state of the congestion control state adjusts the bit rate based on the packet loss rate.

In some aspects, the network protocol may determine (e.g., calculate) a delay threshold and a packet loss threshold. The delay threshold may be a predetermined amount greater than a base latency, with the base latency being determined based on a plurality of packet latencies determined over a window of time.

The predetermined algorithm may include, for example, comparing the packet latency to a packet loss rate, and selecting the congestion control state based on which of the packet latency or packet loss rate most exceeds their respective threshold. In this manner the first state is selected if the packet latency exceeds the delay threshold by an amount greater than the packet loss rate exceeds the packet loss threshold, and the second state is selected if the packet loss rate exceeds the packet loss threshold by an amount greater than the packet latency exceeds the delay threshold. In other examples, the predetermined algorithm may assign priority to one threshold. Accordingly, the predetermined algorithm may select the first state if the packet latency satisfies the delay threshold irrespective of the packet loss rate, or alternatively, select the second state if the packet loss rate satisfies a loss threshold irrespective of the latency.

With further reference to FIG. 3, on the first state being selected the bit rate is reduced in an attempt to reduce latency. The bit rate may be reduced to a predetermined level (e.g., at or below a corresponding threshold), or incrementally reduced by a predetermined increment. The first state may then continue to monitor the data stream to determine if a reduction in latency occurs. After a period of time (e.g., a predetermined period or period calculated based on a metric of the data stream, such as RTT) the network protocol determines whether the packet latency is reduced by a predetermined amount. This amount may be predetermined based on an expected value for the reduction in bit rate or for the newly reduced bit rate. If, for the period of time, the packet latency is not reduced by the predetermined amount then the network protocol increases the bit rate and increases the delay threshold to make the network protocol less sensitive to latency. Additionally, the packet loss threshold may be reduced to make the network protocol more sensitive to packet loss rate.

In this example, on the second state being selected, the bit rate is reduced in an attempt to reduce the packet loss rate. In various aspects, the bit rate is reduced if the packet loss rate satisfies a packet loss threshold (e.g., above the threshold). The second state may then continue to monitor the data stream to determine if a corresponding reduction in packet loss rate occurs. After a period of time (e.g., a predetermined period or period calculated based on a metric of the data stream, such as RTT) the network protocol determines whether the packet loss rate is reduced by a predetermined amount. If, for the period of time, the packet loss rate is not reduced by the predetermined amount then the network protocol may increase the bit rate and increase the packet loss threshold to make the network protocol less sensitive to packet loss rate. Additionally, the delay threshold may be reduced to make the network protocol more sensitive to latency. In this regard, the congestion control state may be switched from the second state to the first state if the packet loss rate satisfies the packet loss threshold after a predetermined period of time in the second state and the packet latency satisfies the delay threshold.

In block 303, the packet latency is compared against a delay threshold. If the packet latency satisfies the delay threshold while the congestion control remains in the first state for more than a predetermined period of time then, in block 304, the congestion control is switched from the first state to the second state.

Figure 4:
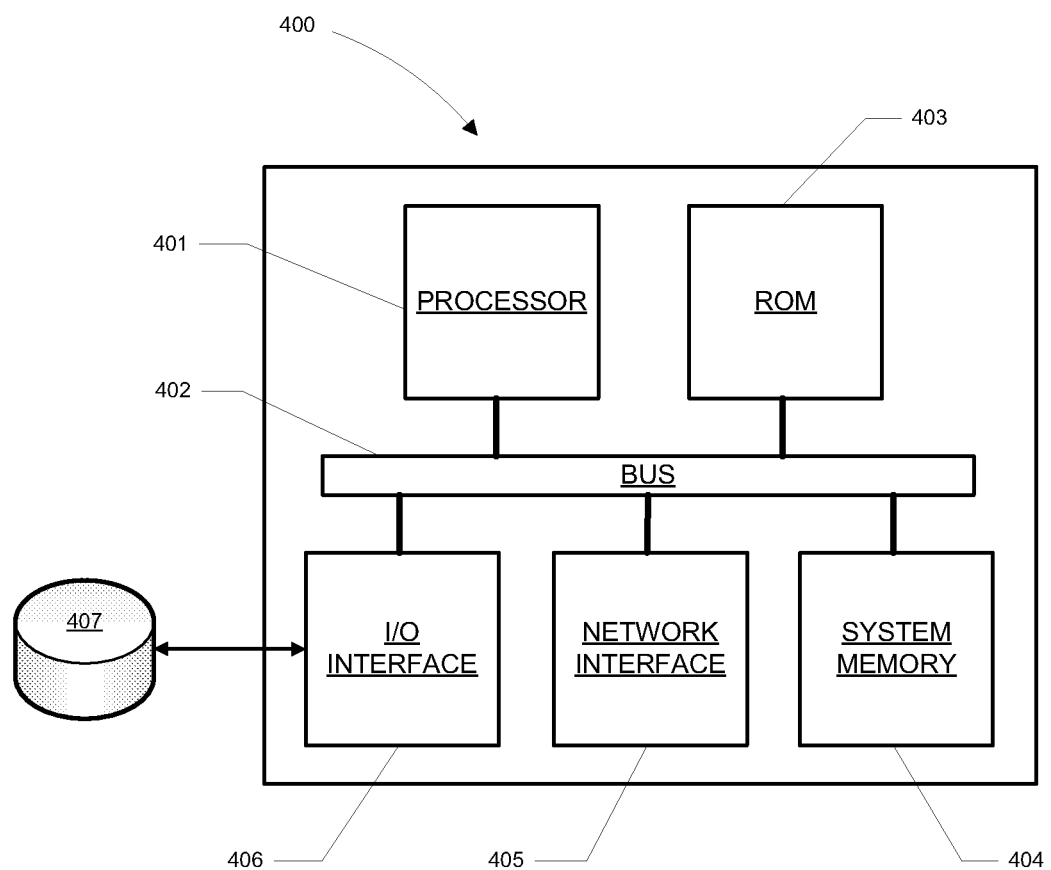
FIG. 4 is a diagram illustrating an example computing system for moving between delay sensing and packet loss based congestion control states, including a processor and other internal components.

FIG. 4 is a diagram illustrating an example computing system for moving between delay sensing and packet loss based congestion control states, including a processor and other internal components, according to one aspect of the subject technology. In some aspects, a computerized device 400 (e.g., a computing device responsible for executing network protocol 100 of FIG. 1, or the methods of FIG. 2 or 3) includes several internal components such as a processor 401, a system bus 402, read-only memory 403, system memory 404, network interface 405, I/O interface 406, and the like. In one aspect, processor 401 may also be communication with a storage medium 407 (e.g., a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from ROM 403, system memory 404, or received from a storage medium 407 (e.g., via I/O interface 406). ROM 403, system memory 404, and storage medium 407 represent examples of (e.g., non-transitory) machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (e.g., via I/O interface 406). Processor 401 is further configured to read data stored in system memory 404 or storage medium 407 and to transfer the read data to the one or more external devices in response to a request from the one or more external devices. The read data may include one or more web pages or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (e.g., processor 401) and one or more external devices (e.g., a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 or the internal devices operably attached thereto.

Various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of blocks in the processes disclosed is an illustration of example approaches. Based upon design preferences, it is understood that the specific order or hierarchy of blocks in the processes may be rearranged. Some of the blocks may be performed simultaneously. The accompanying method claims present elements of the various blocks in a sample order, and are not meant to be limited to the specific order or hierarchy presented.

The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method, comprising:
   determining a packet latency, and a packet loss rate for a data stream;
   selecting a congestion control state for the data stream based on the determined packet latency and the determined packet loss rate and a predetermined algorithm, wherein a first state of the congestion control state adjusts a bit rate associated with the data stream based on the packet latency, and the second state of the congestion control state adjusts the bit rate based on the packet loss rate,
   the predetermined algorithm selecting the first state if the packet latency exceeds a delay threshold by an amount greater than the packet loss rate exceeds a packet loss threshold, or the second state if the packet loss rate exceeds the packet loss threshold by an amount greater than the packet latency exceeds the delay threshold, the packet loss threshold being based on a packet loss rate determined over a window of time; and
   when the first state is selected, switching from the first state to the second state if the packet latency exceeds the delay threshold after a predetermined period of time in the first state.

2. The computer-implemented method of claim 1, further comprising:
   determining a base latency based on a plurality of packet latencies determined over the window of time,
   wherein the delay threshold is a predetermined amount greater than the base latency.

3. The computer-implemented method of claim 1, wherein the first state is selected, further comprising:
   reducing the bit rate;
   determining, for a period of time, whether the packet latency is reduced by a predetermined amount; and if, for the period of time, the packet latency is not reduced by the predetermined amount then increasing the bit rate and increase the delay threshold.

4. The computer-implemented method of claim 3, wherein if, for the period of time, the packet latency is not reduced by the predetermined amount then the packet loss threshold is reduced.

5. The computer-implemented method of claim 1, wherein the second state is selected, further comprising:
reducing the bit rate if the packet loss rate satisfies the packet loss threshold;
determining, for a period of time, whether the packet loss rate is reduced by a predetermined amount; and
if, for the period of time, the packet loss rate is not reduced by the predetermined amount then increasing the bit rate and increase the packet loss threshold.

6. The computer-implemented method of claim 5, wherein if, for the period of time, the packet loss rate is not reduced by the predetermined amount then the delay threshold is reduced.

7. The computer-implemented method of claim 6, wherein the congestion control state is switched from the second state to the first state if the packet loss rate satisfies the packet loss threshold after a predetermined period of time in the second state and the packet latency satisfies the delay threshold.

8. The computer-implemented method of claim 1, further comprising:
calculating the packet latency based on a delta of time between an arrival of one or more first packets and an arrival of one or more subsequent packets at a network device.

9. The computer-implemented method of claim 1, further comprising:
calculating the packet latency based on a delta of time between a departure of one or more first packets and a departure of one or more subsequent packets from a network device.

10. The computer-implemented method of claim 1, further comprising:
calculating the packet latency based on a time lapse between a departure of one or more packets from one or more first terminal devices and an arrival of the one or more packets at one or more second terminal devices.

11. A non-transitory machine-readable medium having instructions stored thereon that, when executed, cause a machine to perform a method, the method comprising:
communicating with a network device by sending and receiving data;
selecting between a first and a second congestion control state for the sending and receiving of the data based on a predetermined algorithm; and
moving between the first and the second congestion control states to maintain a bit rate associated with the sending and receiving at a predetermined threshold,
wherein the first state adjusts a bit rate associated with the sending and receiving based on a packet latency associated with the sending and receiving, and the second state adjusts the bit rate based on a packet loss rate associated with the sending and receiving, and
wherein the predetermined algorithm selects the first state if the packet latency exceeds a delay threshold by an amount greater than the packet loss rate exceeds a packet loss threshold, or the second state if the packet loss rate exceeds the packet loss threshold by an amount greater than the packet latency exceeds the delay threshold, the packet loss threshold being based on a packet loss rate determined over a window of time.

12. The machine-readable medium of claim 11, the method further comprising:
determining the predetermined threshold based on a bit rate observed over the window of time.

13. The machine-readable medium of claim 11, the method further comprising:
reducing the bit rate if the packet latency satisfies the delay threshold;
determining, for a period of time, whether the packet latency is reduced by a predetermined amount; and
if, for the period of time, the packet latency is not reduced by the predetermined amount then increasing the bit rate and increase the delay threshold.

14. The machine-readable medium of claim 11, the method further comprising:
selecting the first state; and
switching from the first state to the second state if the packet latency satisfies the delay threshold after a predetermined period of time in the first state.

15. The machine-readable medium of claim 14, wherein if, for the period of time, the packet latency is not reduced by the predetermined amount then a packet loss threshold is reduced, wherein the first state is switched to the second state only if the packet loss rate satisfies the reduced packet loss threshold.

16. The machine-readable medium of claim 15, wherein the second state is selected, the method further comprising:
reducing the bit rate;
determining, for a period of time, whether the packet loss rate is reduced by a predetermined amount; and
if, for the period of time, the packet loss rate is not reduced by the predetermined amount then increasing the bit rate and increase the packet loss threshold and reduce the delay threshold.

17. A system, comprising:
one or more network devices; and
a memory, the memory including instructions thereon that, when executed, cause the one or more network devices to:
communicate over a network by sending and receiving data;
select between a first and a second congestion control state for the sending and receiving of the data based on a predetermined algorithm; and
move between the first and the second congestion control states to maintain a bit rate associated with the sending and receiving at a predetermined threshold according to the predetermined algorithm,
wherein the first state adjusts a bit rate associated with the sending and receiving based on a packet latency associated with the sending and receiving to maintain the packet latency below a first threshold, and the second state adjusts the bit rate based on a packet loss rate associated with the sending and receiving to maintain the packet loss rate below a second threshold, and
wherein the predetermined algorithm selects the first state if the packet latency exceeds a delay threshold by an amount greater than the packet loss rate exceeds a packet loss threshold, or the second state if the packet loss rate exceeds the packet loss threshold by an amount greater than the packet latency exceeds the delay threshold, the packet loss threshold being based on a packet loss rate determined over a window of time.

* * * * *